United States Patent
Kurth (10) Patent No.: US 7,827,863 B2
(45) Date of Patent: Nov. 9, 2010

(54) LOCOMOTIVE FUEL TANK SIGHT GLASS IN-SITU CLEANING SYSTEM

(75) Inventor: Randy Kurth, Livermore, CO (US)

(73) Assignee: Locomotive Servicws, LLC, Livermore, CO (US)

( * ) Notice: Subject to any disclaimer, the term of this patent is extended or adjusted under 35 U.S.C. 154(b) by 720 days.

(21) Appl. No.: 11/655,686

(22) Filed: Jan. 19, 2007

(65) Prior Publication Data

US 2008/0173087 A1    Jul. 24, 2008

(51) Int. Cl.
    *G01F 23/02*    (2006.01)
(52) U.S. Cl. .......................................... 73/324
(58) Field of Classification Search . 15/104.05–104.33, 15/104.03; 73/324
    See application file for complete search history.

(56) References Cited

U.S. PATENT DOCUMENTS

| | | | | |
|---|---|---|---|---|
| 1,252,656 A | * | 1/1918 | Breen ........................... | 73/324 |
| 1,595,021 A | * | 8/1926 | Plunkett ....................... | 73/332 |
| 2,206,006 A | * | 6/1940 | Hendrey ....................... | 73/324 |
| 2,765,660 A | * | 10/1956 | De Hart ....................... | 73/324 |
| 3,393,564 A | * | 7/1968 | Simmons ...................... | 73/324 |
| 5,611,241 A | * | 3/1997 | Henry et al. ................... | 73/323 |
| 6,869,708 B2 | * | 3/2005 | Kelley et al. ................... | 429/23 |

OTHER PUBLICATIONS

Wilbur Curtis Company Inc. Cleaning Instructions for the TLXG15 Thermopro Coffeemaker, Apr. 2005.*

* cited by examiner

*Primary Examiner*—John Fitzgerald
(74) *Attorney, Agent, or Firm*—Craig R. Miles; CR Miles, P.C.

(57) ABSTRACT

Generally, a fuel tank sight glass cleanable without disassemble. Specifically, a fuel tank sight glass in which a sight glass cleaner element travels to remove deposition material from the surface of the surface of a sight glass.

14 Claims, 4 Drawing Sheets

LOCOMOTIVE FUEL TANK SIGHT GLASS IN-SITU CLEANING SYSTEM

I. BACKGROUND

Generally, a fuel tank sight glass cleanable without disassembly. Specifically, a fuel tank sight glass in which a sight glass cleaner element travels to remove deposition material from the surface of a sight glass.

Conventional fuel tank sight glass assemblies can be mounted to fuel tanks at a location which allows an observer to view the level of an amount of fuel in the fuel tank sight glass assembly. The fuel level in the fuel tank sight glass assembly indicates the corresponding fuel level in the fuel tank. A significant problem with conventional fuel tank sight glass assemblies can be that certain deposition materials in the fuel can form a layer of the deposition material on the inside surfaces of the fuel tank sight glass assembly including the sight glass through which the fuel level can be observed. Over time the layer of deposition material on the inside surface of the sight glass becomes thick enough to hid or obscure the fuel level or other viewable indicia of fuel level from the observer. Conventional fuel tank sight glass assemblies may then have to be disassembled from the fuel tank whether in whole or in part to allow removal of the layer of deposition material on the inside surfaces of the fuel tank sight glass assembly. The conventional fuel tank sight glass can then be reassembled to the fuel tank; however, the layer of deposition material on the inside surface again begins to again form necessitating repeated disassembly and reassembly of conventional fuel tank sight glass assemblies for removal of the layer of deposition material.

With respect to certain types of fuels, such as diesel fuels and especially diesel fuels combusted in train locomotive engines, the formation of the layer of deposition material can occur over a relatively short duration of time necessitating repeated, costly, time consuming disassembly and reassembly of the fuel tank sight glass assemblies of locomotive fuel tanks.

Even though the use of conventional fuel tank sight glass assemblies is widespread, there remains the long standing problem of having to disassemble and reassemble conventional fuel tank sight glass assemblies to remove the layer of deposition material on the inside surfaces of such conventional fuel tank sight glass assemblies by fuels to allow observation of fuel level.

II. SUMMARY OF THE INVENTION

Accordingly, a broad object of the invention can be to provide an inventive fuel tank sight glass which includes a fuel tank site glass cleaner element locatable inside the fuel tank sight glass which engages the inside surfaces of the fuel tank sight glass to remove or reduce thickness of the layer of deposition material deposited by fuel.

A second broad object of the invention can be to provide the inventive fuel tank sight glass as a kit to retrofit or replace in whole or in part a conventional fuel tank sight glass assembly fitted to a fuel tank.

A third broad object of the invention can be to provide embodiments of the inventive fuel tank sight glass coupled to fuel tanks for train locomotives or provide embodiments of the inventive fuel tank sight glass as a kit for replacement of conventional fuel tank sight glass assemblies utilized on fuel tanks of train locomotives whether in whole or in part which allows removal of the layer of deposition material deposited by fuels combusted by such train locomotives without or avoiding disassembly and subsequent reassembly of the inventive fuel tank sight glass.

Naturally, further objects of the invention are disclosed throughout other areas of the specification, drawings, and claims.

IV. DETAILED DESCRIPTION OF THE PREFERRED EMBODIMENTS

Generally, a fuel tank sight glass cleanable without disassembly. Specifically, a fuel tank sight glass in which a sight glass cleaner element travels to remove deposition material from the surface of a sight glass.

Now referring primarily to FIGS. 1 and 2, a particular inventive method of utilizing an inventive fuel tank sight glass (1) (hereinafter referred to as the "fuel tank sight glass") can be performed by establishing an amount of fuel (2) in a conduit element (3) (see FIG. 2) of the fuel tank sight glass (1). Over time the amount of fuel (2) established in the conduit element (3) of the fuel tank sight glass (1) may act to hide or obscure viewable indicia (5) of the fuel level (4) in the conduit element (3) by depositing a layer of deposition material (6)(see FIG. 6) on the inside surface (7) of the sight glass (8) of the fuel tank sight glass (1). By generating an amount of sight glass cleaner element travel (9) of a sight glass cleaner element (10) in the conduit element (3) of the fuel tank sight glass (1) the sight glass cleaner element (10) can sufficiently engage the inside surface (7) of the sight glass (8) to remove the deposition layer (6), in whole or in part, without disassembly of the fuel tank sight glass (1).

Certain embodiments of the inventive method, can further include the step of inserting and removing the sight glass cleaner element (10) into and from the conduit element (3) of the fuel tank sight glass (1) by passing the sight glass cleaner element (10) through a passage (II) of a conduit access aperture element (12) of the fuel tank sight glass (1). As to other embodiments of the fuel tank sight glass (1), the sight glass cleaner element (10) can further be made responsive to a flexible shaft (13) of sufficient length to locate a portion of the flexible shaft (13) outside of the fuel tank sight glass (1). By applying an amount of force sufficient to generate an amount of flexible shaft travel (14) in the portion of the flexible shaft (13) located outside of the fuel tank sight glass (1), a corresponding amount of sight glass cleaner element travel (9) can be generated in the sight glass cleaner element (10) inside the conduit element (3) of the fuel tank sight glass (1).

Alternately, as to certain embodiments of the inventive method, the amount of sight glass cleaner element travel (9) of the sight glass cleaner element (10) inside the conduit element (3) of the fuel tank sight glass (1) can be achieved by making the sight glass cleaner element (10) responsive to the amount of fuel (2) or the level of the fuel (4) in the conduit element (3), and as to other embodiments of the inventive method an amount of sight glass cleaner element travel (9) of the sight glass cleaner element (10) in the conduit element (3) can be achieved by coupling the sight glass cleaner element (10) to a magnetic force (43) from a magnetic field source (46).

Now referring primarily to FIGS. 2-6, a particular embodiment of the inventive fuel tank sight glass (1) can include a sight glass back plate (15) having a first surface (16) configured to couple with a correspondingly configured fuel tank surface (17) of a fuel tank (18). As to certain embodiments of the fuel tank sight glass (1) the sight glass back plate (15) can couple directly to the fuel tank (18) or as to other embodiments of the fuel tank sight glass (I) the sight glass back plate (15) can couple to a fuel tank mount (19) located between the fuel tank surface (17) and the first surface (16) of the sight glass back plate (15). In instances in which the fuel tank sight glass (I) is retrofitted to a fuel tank (18) having a conventional fuel sight glass assembly, the sight glass back plate (15) can be configured to mate with the conventionally configured fuel tank mount (45), or a remaining portion of the conventional fuel sight glass assembly, or directly to the fuel tank (18) entirely replacing the conventional sight glass assembly. It is not intended that utilization of the fuel tank sight glass (1) be limited to any particular configuration of fuel tank (18) or that the fuel tank (18) be utilized as part of any particular device or with an amount of fuel (2) of any particular type or kind. Rather, it is intended that the fuel tank sight glass (1) be utilized with a numerous and wide variety of configurations of fuel tanks (18) which can correspondingly contain an amount of fuel (2) of numerous and varied kinds and without limitation of the forgoing, the inventive fuel tank sight glass (1) is intended to be utilized with fuel tanks (18) of train locomotives, diesel locomotives, or the like, and an amount of fuel (2) contained by such train locomotive fuel tanks (18), such as "red dye diesel", "high sulfur diesel", bio-diesel or other synthetic non-fossil fuels, or other fuels along with any additives such as dyes, cleaners, combusted by locomotive engines and which may further include additives such as dyes, cleaners, or the like.

The sight glass back plate (15), or the sight glass back plate (15) coupled to the fuel tank mount (19), or a portion of a conventional fuel tank sight glass assembly (45), individually or in joined combination can provide a first aperture element (20) (or the alignment of aperture elements of joined parts) having a location on the sight glass back plate (15) or on the sight glass back plate (15) coupled to the fuel tank mount (19)) which allows the amount of fuel (2) contained in the fuel tank (18) to flow into the fuel tank sight glass (1) and a second aperture element (21) which allows an amount of gas (22) (see FIG. 1) inside of the inventive fuel tank sight glass (1) displaced by the amount of fuel (2) which flows into the fuel tank sight glass (1) to flow back into the fuel tank (18) at a location above the fuel level (4) in the fuel tank (18). This configuration can establish a fuel level (4) in the fuel tank sight glass (1) which indicates the fuel level (4) in the fuel tank (18). The first aperture element (20) and the second aperture element (21) while shown as circular aperture elements in the figures need not be circular and can be configured in any manner which allows a flow of an amount of fuel (2) from the fuel tank (18) to the fuel tank sight glass (1) and the egress of the amount of gas (22) displaced from the fuel tank sight glass (1) to the fuel tank (18) as above described.

Figure 6:
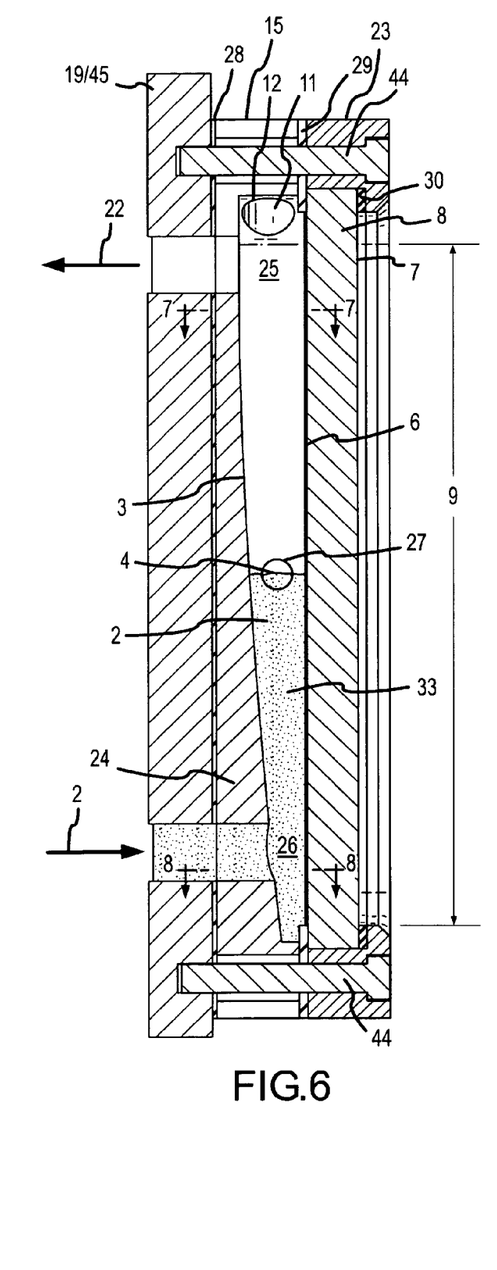
FIG. 6 is a cross section view 6-6 of a particular embodiment of the inventive fuel tank sight glass shown in FIG. 3.
Figure 7:
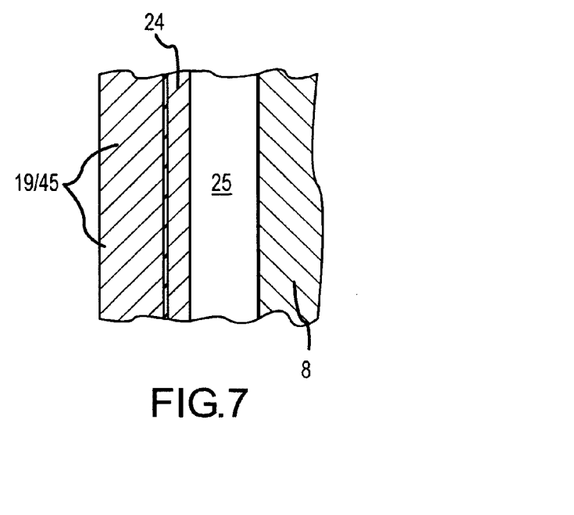
FIG. 7 is a cross section view 7-7 of the particular embodiment of the inventive fuel tank sight glass shown in FIG. 6.
Figure 8:
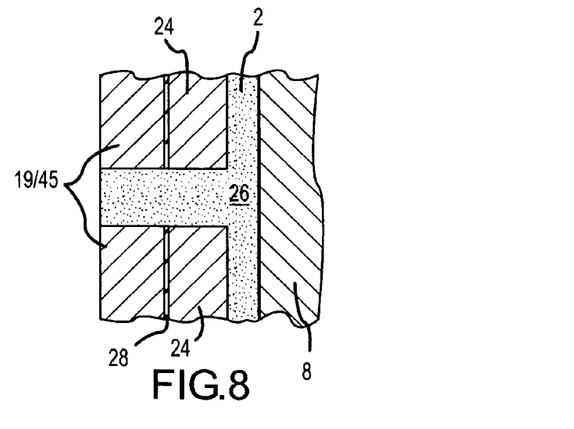
FIG. 8 is a cross section view 8-8 of the particular embodiment of the inventive fuel tank sight glass shown by FIG. 6.

The fuel tank sight glass (1) can further include a sight glass front plate (23) which can join or removably join to the sight glass back plate (15) (or as to certain embodiments the sight glass back plate (1 5) and the sight glass front plate (23) and the sight glass (8) further described below can be produced as one single piece) to establish the conduit element (3) between the first aperture element (20) and the second aperture element (21) in which the amount of fuel (2) and the amount of gas (22) flow in the fuel tank sight glass (1). The configuration of the conduit element (3) can vary from embodiment to embodiment of the fuel tank sight glass (1). For example, as shown in FIG. 2, the conduit element (3) can have substantially uniform configuration between the first aperture element (20) and the second aperture element (21), or for example, as shown in FIG. 6, the conduit element (3) can further include a taper element (24) which establishes greater cross sectional area (25) of the conduit element (3) proximate to the second aperture element (21) and lesser cross sectional area (26) proximate to the first aperture element (20). However, these two examples are not intended to limit the configurations of the conduit element (3) which can be utilized in the fuel tank sight glass (1) and numerous and varied other configurations of the conduit element (3) can utilized which allow the amount of fuel (2) to achieve a fuel level (4) in the fuel tank sight glass which indicates the fuel level (4) in the fuel tank (18).

The fuel tank sight glass (1) can further include the sight glass (8) coupled to the sight glass front plate (23) which allows observation of the viewable indicia (5) of the fuel level (4) in the conduit element (3). The sight glass (8) can be configured in any manner and from any material compatible with the amount of fuel (2) which allows observation of the viewable indicia (5) in the portion of the conduit element (3) utilized to indicate the fuel level (4). As such, the sight glass (8) need not be completely transparent but only sufficiently transparent for observation of the viewable indicia (5) within the conduit element (3). The viewable indicia (5) can be, as to certain embodiments of the fuel tank sight glass (1), the gas-liquid interface established between the amount of fuel (2) in the conduit element (3) and the amount of gas (22) in the conduit element (3). The viewable indicia (5) of the fuel level (4) can further include, whether individually or in various permutations and combinations, a material which floats (27) on the amount of fuel (2) in the conduit element (3), such as a cylindrical float, a spherical float, or other configuration of float (whether hollow or having lesser density than the amount of fuel (2)), fuel level indicators (5) fixed to the surface of the conduit element (3) or the inside surface (7) of the sight glass (8), or both (such as engraved marks, applied marks, or the like).

With respect to certain embodiments of the fuel tank sight glass (1), a first seal element (28) can be disposed between the fuel tank mount (19) and the sight glass back plate (15) to prevent or reduce passage of the amount of fuel (2) between the sealed surfaces under compression. As shown in FIG. 2, the first seal (28) can be produced from sheet material such as sheet cork, gasket paper, sheet metal, felt, fiberglass, plastic polymer, or the like, or could be O-rings, or other material which compresses sufficiently to fill irregularities in the sealed surfaces under compression; however, other types of sealants which can be applied as a film to mated surfaces which cure to establish a seal between mated parts to prevent or reduce the passage of the amount of fuel (2). Similarly, a second seal element (29) can be disposed between the sight glass back plate (15) and the sight glass front plate (23), and similarly, a third seal (30) can be disposed between the sight glass front plate (23) and the sight glass (8). However, to the extent that the inventive fuel tank sight glass is constructed as one single piece one or more of these seals (28)(29)(30) may be eliminated from the constructional form of the fuel tank sight glass (1). Compression of the seals (28)(29)(30) can be established by operation of the retaining elements (44) which can be used to forcibly urge engagement of the corresponding surfaces of the fuel tank mount (19), the sight glass back plate (15), the sight glass front plate (23), and the sight glass (8). Understanbly, numerous and varied configurations of mechanical hardware are encompassed by the term "retaining elements" even though the figures show a plurality of bolts a portion of each providing a spiral thread which rotatingly engages a mated spiral thread of the fuel tank mount (19), such as studs which receive spirally threaded nuts, screws, adhesive, or the like.

The fuel tank sight glass (1) can further include the sight glass cleaner element (10) locatable in the conduit element (3). The sight glass cleaner element (10) of the non-limiting example shown in FIG. I provides a plurality of flexible members (31) (such as flexible bristles, flexible wires, or the like) which extend from a cleaner element hub (32) coaxially disposed in the conduit element (3). The plurality of flexible members (31) can have a configuration which allows sight glass cleaner element travel (9) of the sight glass cleaner element (10) in the conduit element (3) while a part of the plurality of flexible members (31) engage the inside surface (7) of the sight glass (8). The plurality of flexible members (31) can provide sufficient flexure such that the sight glass cleaner element (10) can alter configuration during sight glass cleaner element travel (9) in the conduit element (3) to adjust to configuration of the conduit element (3) at any particular location along the flow path (33) of the conduit element (3). For example, the plurality of flexible members (31) can provide sufficient flexure to maintain engagement with the inside surface (7) of the sight glass (8) even in configurations of the conduit element (3) which taper from the greater cross sectional area (25) to a lesser cross sectional area (26) as shown in FIG. 6. However, it is not intended that the sight glass cleaner element (10) be limited to a configuration including a plurality of flexible members (31) which extend from a hub (32) and the sight glass cleaner element (10) can as to other embodiments of the fuel tank sight glass (I) comprise an amount of material such as foam, foam impregnated with abrasive elements, or other compressible material which can travel in the conduit element (3) while a part engages a corresponding part of the inside surface (7) of the sight glass (8), even in those embodiments in which the sight glass (8) may be configured with projections or have relief elements, or configured to include a taper element (24), or otherwise alters in configuration over the flow path (33) of the conduit element (3); or can comprise a portion of rigid material (such as a cylindrical rod, braided or twisted wire, a sheet material, or the like, whether solid or hollow) coupled to a flexible or compressible material (or other material characteristic which allows an alterable configuration) such as bristles or foam with the combination configured to engage a surface of the sight glass (8) during sight glass cleaner element travel (9) in the conduit element (3) with the flexible or compressible portion sufficiently flexible or compressible to alter in configuration to engage areas of the sight glass (8) which may project or have relief, or provide sufficient flexibility or compressibility to allow sight glass cleaner element travel (9) in a conduit element (3) which alters in configuration between the first aperture element (20) and the second aperture element (21).

As to certain embodiments of the fuel tank sight glass (1), the sight glass cleaner element (10) can be a discrete element located in the conduit element (3) which travels (9) in response to altered fuel level (4) in the conduit element (3). As to these embodiments of the invention, a portion of the flexible material, compressible material, or rigid material, or combinations and permutations thereof, can be provided with a sufficient lesser density than the amount of fuel (2) to generate travel of the sight glass cleaner element (10) in the conduit element (3) as the fuel level (4) rises in the conduit element (3) and can be provided with sufficient mass to allow travel (9) in the conduit element (3) as fuel level (4) lowers in the conduit element (3).

As to other embodiments of the fuel tank sight glass (1), the sight glass cleaner element (10) can further include an amount of material (34) responsive to the magnetic field (43) (whether as one single piece or distributed as a plurality of particles or pieces over the sight glass cleaner element (10)) such as an amount of a metal (for example, an amount of iron) coupled to the flexible material, compressible material, or rigid material of the sight glass cleaner element (10). The magnetic field (43) can be generated from a magnetic field source (46) such as a magnet or an electric field. Location of the magnetic field (43) proximate to the sight glass cleaner element (10) which includes an amount of material (34) responsive to a magnetic field (43) can generate sight glass cleaner element travel (9) of the sight glass cleaner element (10) in the conduit element (3).

As to certain embodiments of the fuel tank sight glass (1) a conduit access aperture element (12) provides a passage (1) between the external surface (35) of the fuel tank sight glass (1) and the conduit element (3). The conduit access aperture element (12) and the corresponding passage (11) can have a location above the fuel level (4) in the fuel tank (18). The passage (11) established by the conduit access aperture element (12) can be configured to allow ingress to and egress from the conduit element (3) of the sight glass cleaner element (10). As to these embodiments of the fuel tank sight glass (1), the sight glass cleaner element (10) can further include a flexible shaft (13) having sufficient length to locate the sight glass cleaner element (10) in the conduit element (3) while a portion of the length of the flexible shaft (13) remains external to the fuel tank sight glass (1). The flexible shaft (13) can be produced as a twisted wire (whether of metal wire, plastic wire, or plastic coated metal wire) or other constructional form which has sufficient flexibility to pass through the conduit access aperture element (12) to locate the sight glass cleaner element (10) in the conduit element (3) of the fuel tank sight glass (1). The portion of the flexible shaft (13) remaining external to the fuel tank sight glass (1) can be made responsive to a part of a body (36) (such as one or a pair of hand(s)(37)) of a person (38). An amount of flexible shaft travel (14) generated by the part of the body (36) of the person (38) can generate a corresponding amount of sight glass cleaner element travel (9) of the sight glass cleaner element (10) coupled to the flexible shaft (13) in the conduit element (3) of the fuel tank sight glass (1). Sufficient flexible shaft travel (14) external to the fuel tank sight glass (1) allows removal of the sight glass cleaner element (10) from the conduit element (3).

The fuel tank sight glass (1) can further include a closure element (39)(see FIG. 3) coupled to the conduit access aperture element (12) which operates between an open condition (40) allowing access to the passage (11) of conduit access aperture element (12) and a closed condition (41) which seals access to the passage (11) of the conduit access aperture element (12). Numerous and varied configurations of the closure element (39) can be utilized to allows sealable access to the conduit access aperture element (12). While the Figures show a plug which removably inserts into the conduit access aperture element (12), this is not intended to limit the closure element (39) to that constructional form and the closure element (39) can as a further example include a cylindrical projection extending from the conduit access aperture element (12) having a portion coupled to spiral thread which rotatingly mates with a spiral thread coupled to a cap, or as a further example can comprise an oil hole cover such as available from McMaster and Carr, part number 1231K2, or the like.

Figure 1:
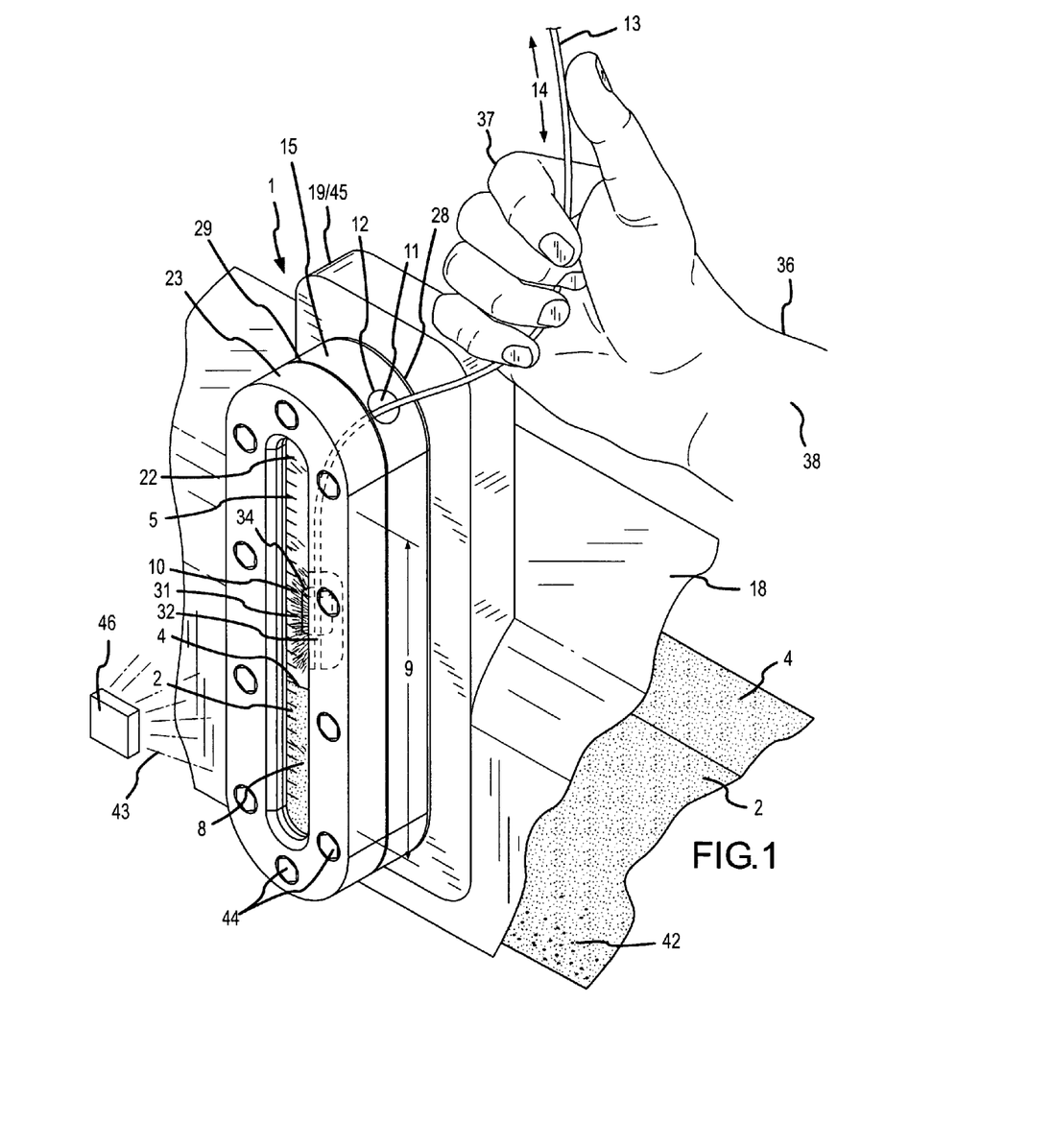
FIG. 1 is a perspective drawing showing a particular inventive method of cleaning a particular embodiment of the inventive fuel tank sight glass.
Figure 2:
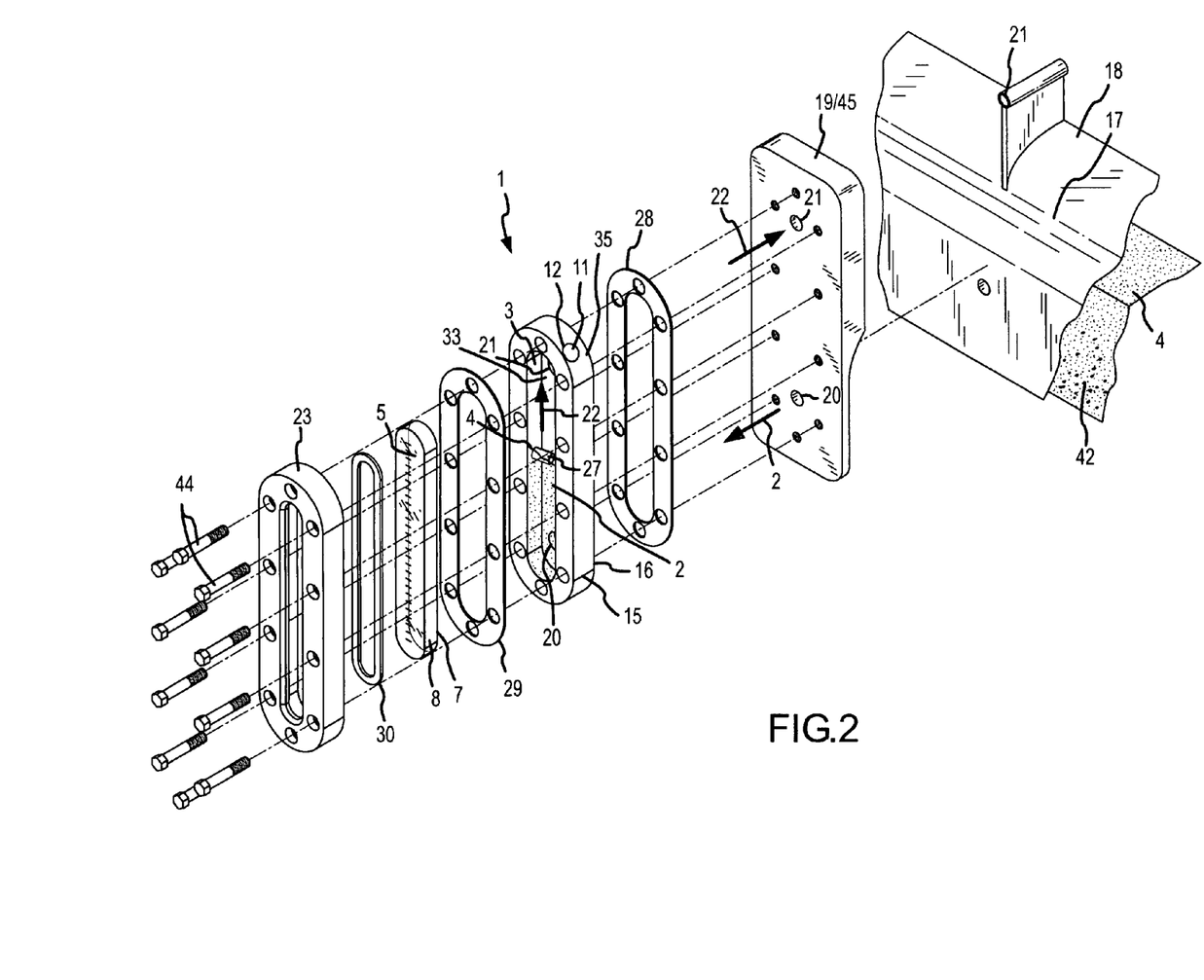
FIG. 2 is an exploded view of a particular embodiment of the inventive fuel tank sight glass.
Figure 3:
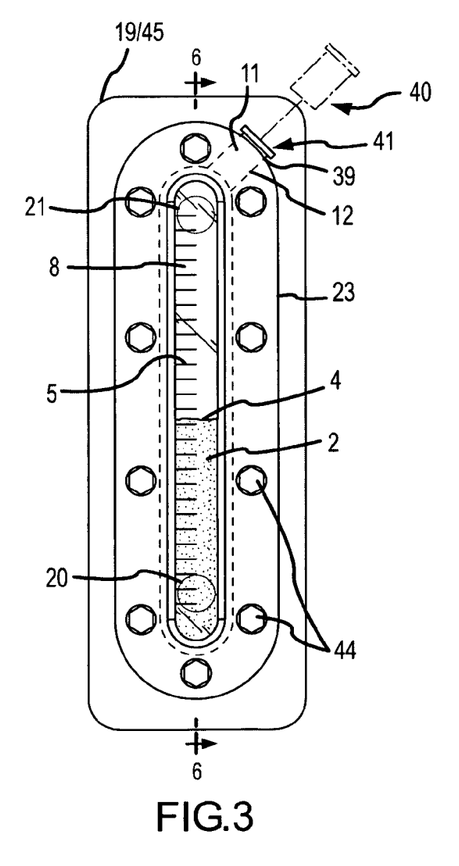
FIG. 3 is a front view of a particular embodiment of the inventive fuel tank sight glass.
Figure 4:
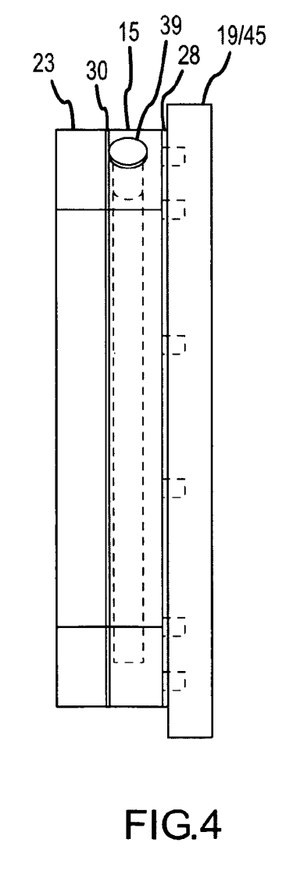
FIG. 4 is a side view of a particular embodiment of the inventive fuel tank sight glass.
Figure 5:
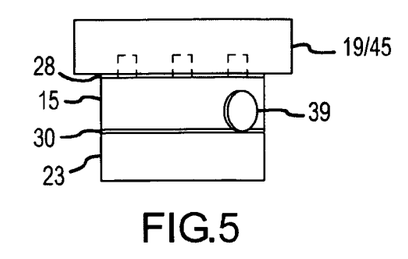
FIG. 5 is a top view of a particular embodiment of the inventive fuel tank sight glass.

Now referring specifically to FIG. 1, the amount of fuel (2) and without limitation an amount of fuel (2) combustable by train locomotive engines, diesel engines, or other engines which combust diesel fuels or other fuels can contain deposition materials (42) which adhere, settle, attach or otherwise separate from the amount of fuel (2) to establish a deposition layer (6)(see FIG. 6) of the deposition material (42) on all or a portion of the inside surface (7) of the sight glass (8) which can hid or obscure the viewable indicia (5) of the fuel level (4). The term "deposition materials" is intended to broadly encompass any material or materials in combination entrained by the amount of fuel (2) (or other liquid in the fuel tank (18)) (such as the dye in red dye diesel fuel) which can stain, adhere, settle, or form the deposition layer (6) on the inside surfaces of the fuel tank sight glass (1). The term "deposition layer" broadly includes any amount, thickness, or staining of or by deposition materials (42) which settle, adhere, attach or otherwise form on the inside surfaces of the fuel tank sight glass (1). Sight glass cleaner element travel (9) of the sight glass cleaner element (10) in the conduit element (3) of the fuel tank sight glass (1) can remove, or reduce thickness of, the deposition layer (6) allowing observation of the viewable indicia (5) without disassembly of the fuel tank sight glass (1).

As can be easily understood from the foregoing, the basic concepts of the present invention may be embodied in a variety of ways. The invention involves numerous and varied embodiments of an inventive fuel tank sight glass (1) and methods of manufacturing and using such inventive fuel tank sight glass (1)

As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "sight glass cleaner" should be understood to encompass disclosure of the act of "sight glass cleaning"—whether explicitly discussed or not—and, conversely, were there effectively disclosure of the act of "sight glass cleaning", such a disclosure should be understood to encompass disclosure of a "sight glass cleaner" and even a "means for sight glass cleaning." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each fuel tank sight glass herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below are intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A locomotive fuel tank sight glass, comprising;
   a) a sight glass back plate which couples to a locomotive fuel tank, wherein said sight glass back plate has a first aperture element having a location which allows an amount of fuel contained in said locomotive fuel tank to flow into said locomotive fuel tank sight glass, and wherein said sight glass back plate has a second aperture element which allows an amount of gas displaced by said fuel which flows into said locomotive fuel tank sight glass to flow into said locomotive fuel tank, whereby said amount of fuel which flows into said locomotive fuel tank sight glass establishes a fuel level in said locomotive fuel tank sight glass which indicates fuel level in said locomotive fuel tank;
   b) a sight glass front plate which joins to said sight glass back plate, wherein said sight glass front plate joined to said sight glass back plate establishes a conduit element of generally rectangular cross section between said first aperture element and said second aperture element;
   c) a sight glass coupled to said sight glass front plate which allows said fuel level to be viewed in said conduit element;
   d) a taper element coupled to said sight glass back plate which tapers toward said sight glass to establish a greater cross sectional area of the conduit element proximate said second aperture element and a lesser cross sectional area proximate said first aperture element; and
   e) a conduit access aperture element coupled to said fuel tank sight glass which establishes a passage between an external surface of said locomotive fuel tank sight glass and said conduit element, and wherein said conduit access aperture element has a configuration which allows access to said conduit element at a location above said fuel level in said locomotive fuel tank with a sight glass cleaner element configured to slidely engage said taper element to forcibly urge said sight glass cleaner element against said sight glass without disassembly of said locomotive fuel tank sight glass.

2. A locomotive fuel tank sight glass as described in claim 1, further comprising a closure element coupled to said conduit access aperture element which operates between an open condition allowing access to said conduit access aperture element and a closed condition which seals access to said conduit access aperture element.

3. A locomotive fuel tank sight glass as described in claim 1, further comprising a flexible shaft having a first end and a second end, said sight glass cleaner element responsive to said second end of said flexible shaft.

4. A locomotive fuel tank sight glass as described in claim 3, further comprising a deposition material contained in said amount of fuel, wherein said deposition material generates a deposition layer on a surface of said sight glass, and wherein said sight glass cleaner element configured to slidely engage said taper element to forcibly urge said sight glass cleaner element against said sight glass removes said deposition layer from said surface of said sight glass.

5. A locomotive fuel tank sight glass as described in claim 1, further comprising a fuel tank mount coupled between said locomotive fuel tank and said sight glass back plate, wherein said fuel tank mount has a first mount aperture which aligns with said first aperture element of said sight glass back plate and a second mount aperture aligned with said second aperture element of said sight glass back plate such alignment allowing said amount of fuel contained in said locomotive fuel tank to flow into said locomotive fuel tank sight glass and said amount of gas displaced by said fuel which flows into said locomotive fuel tank sight glass to flow into said locomotive fuel tank.

6. A locomotive fuel tank sight glass as described in claim 5, further comprising:
   a. a first seal element disposed between said fuel tank mount and said sight glass back plate;
   b. a second seal element disposed between said sight glass back plate and said sight glass front plate; and
   c. a third seal element disposed between said sight glass front plate and said sight glass.

7. A method of cleaning a locomotive fuel tank sight glass, comprising the steps of:
   a) flowing an amount of a fuel from a locomotive fuel tank to a conduit element of generally rectangular cross section established between a first aperture element and a second aperture element disposed within said locomotive fuel tank sight glass, and wherein said locomotive fuel tank sight glass has a sight glass which allows viewing of a fuel level in said conduit element, and wherein said conduit element has a taper element which tapers toward said sight glass between said second aperture element and said first aperture element to establish a greater cross sectional area of the conduit element proximate said second aperture element and a lesser cross sectional area proximate said first aperture element;
   b) generating a deposition layer of a deposition material in said amount of fuel on a surface of said sight glass;
   c) inserting a sight glass cleaner element through a conduit access aperture element which provides a passage between an external surface of said locomotive fuel tank sight glass and said conduit element above said fuel level;
   d) generating travel of said sight glass cleaner element within said conduit element;
   e) slidely engaging said sight glass cleaner element with said taper element to forcibly urge said sight glass cleaner element against said surface of said sight glass in as said conduit element; and
   f) removing said deposition layer from said surface of said sight glass by travel of said sight glass cleaner element in said conduit element without disassembly of said fuel tank sight glass.

8. A method of cleaning a locomotive fuel tank sight glass as described in claim 7, wherein said step of generating travel of said sight glass cleaner element within said conduit element comprises the steps of:
   a. inserting said sight glass cleaner element coupled to a first end of a flexible shaft into said conduit element of said locomotive fuel tank sight glass; and
   b. generating travel in said flexible shaft.

9. A method of cleaning a locomotive fuel tank sight glass as described in claim 8, wherein said step of generating travel in said flexible shaft further comprises the step of engaging said flexible shaft at a location established outside of said conduit element of said locomotive fuel tank sight glass; and applying sufficient force to said flexible shaft to generate travel of said sight glass cleaner element inside of said conduit element of said locomotive fuel tank sight glass.

10. A method of using a fuel tank sight glass as described in claim 9, further comprising the step of establishing a closure element coupled to said conduit access aperture element in an open condition.

11. A method of manufacturing a locomotive fuel tank sight glass, comprising the steps of:

a) coupling a conduit element of generally rectangular cross section disposed between a first aperture element and a second aperture element to a locomotive fuel tank to receive a flow of fuel from said locomotive fuel tank;
b) coupling a sight glass to said conduit element which allows viewing of a fuel level in said conduit element which corresponds to said fuel level in said locomotive fuel tank;
c) coupling a taper element within said conduit element which tapers toward said sight glass to establish a greater cross sectional area of said conduit element proximate said second aperture element and lesser cross sectional area proximate said first aperture element;
d) coupling a conduit access aperture element to said locomotive fuel tank sight glass which provides a passage between an external surface of said locomotive fuel tank sight glass and said conduit element at a location above said fuel level in said conduit element, said passage configured to receive a sight glass cleaner element which slidely engages said taper element to forcibly urge said sight glass cleaner element against said sight glass without disassembly of said fuel tank sight glass.

12. A method of manufacturing a locomotive fuel tank sight glass as described in claim 11, further comprising the step of coupling said sight glass cleaner element to a travel generation element capable of generating travel of said sight glass cleaner element inside of said conduit element.

13. A method of manufacturing a locomotive fuel tank sight glass as described in claim 11, wherein said step of coupling said sight glass cleaner element to a travel generation element capable of generating travel of said sight glass cleaner element inside of said conduit element comprises coupling said sight glass cleaner element to a material responsive to magnetic force or to a flexible shaft.

14. A method of manufacturing a locomotive fuel tank sight glass as described in claim 11, wherein said step of coupling a conduit element of generally rectangular cross section disposed between a first aperture element and a second aperture element to a locomotive fuel tank to receive a flow of fuel from locomotive fuel tank comprises the step of joining a sight glass back plate and a sight glass front plate, wherein said step of joining said sight glass front plate to said sight glass back plate establishes said conduit element of generally rectangular cross section between said first aperture element and said second aperture element.

* * * * *

UNITED STATES PATENT AND TRADEMARK OFFICE
CERTIFICATE OF CORRECTION

PATENT NO. : 7,827,863 B2  Page 1 of 1
APPLICATION NO. : 11/655686
DATED : November 9, 2010
INVENTOR(S) : Randy R. Kurth

It is certified that error appears in the above-identified patent and that said Letters Patent is hereby corrected as shown below:

On the Title Page, Item (73), in the Assignee line: replace "Locomotive Servicws, LLC" with --Locomotive Services, LLC--.

On the Title Page, Item (57), in the Abstract: following "deposition material from" delete "the surface of".

Signed and Sealed this

Twenty-first Day of December, 2010

David J. Kappos
*Director of the United States Patent and Trademark Office*